(12) United States Patent
Swinford

(10) Patent No.: US 7,946,348 B2
(45) Date of Patent: May 24, 2011

(54) ROTATION TOOL

(76) Inventor: Jerry L. Swinford, Spring, TX (US)

( * ) Notice: Subject to any disclaimer, the term of this patent is extended or adjusted under 35 U.S.C. 154(b) by 826 days.

(21) Appl. No.: 11/848,614

(22) Filed: Aug. 31, 2007

(65) Prior Publication Data

US 2009/0056497 A1  Mar. 5, 2009

(51) Int. Cl.
*E21B 23/00* (2006.01)

(52) U.S. Cl. ............. 166/381; 166/117.7; 166/178; 166/237; 166/301

(58) Field of Classification Search ............. 166/301, 166/381, 117.7, 177.7, 177.6, 178, 237
See application file for complete search history.

(56) References Cited

U.S. PATENT DOCUMENTS

| | | |
|---|---|---|
| 5,224,547 A | 7/1993 | Burns |
| 5,310,001 A | 5/1994 | Burns |
| 5,584,342 A | 12/1996 | Swinford |
| 5,918,690 A | 7/1999 | Hailey |
| 7,467,672 B2 * | 12/2008 | Cruickshank ............. 175/61 |

* cited by examiner

*Primary Examiner* — Daniel P Stephenson
*Assistant Examiner* — Brad Harcourt
(74) *Attorney, Agent, or Firm* — Keeling Patents & Trademarks, LLC; Melissa M. Martinez; Kenneth A. Keeling

(57) ABSTRACT

A downhole rotation tool comprises a housing rotatable and axially slideable in relation to a gear shaft. The gear shaft is located interior of the housing. A tube gear is located intermediate the gear shaft and the housing. Helical threading on the gear shaft exterior interacts with helical threading interior of the tube gear to impart rotation of the tube gear upon linear movement of the gear shaft. A gear face at a lower end of the tube gear interacts with a corresponding gear face on the housing. Face gear teeth of the tube gear and the housing include axially-aligned engaging surfaces to rotate the housing in a preferred direction on downward stroke of the gear shaft and include inclined slip surfaces to allow relative rotation of the housing gear face and the tube gear face upon upward stroke of the gear shaft.

18 Claims, 5 Drawing Sheets

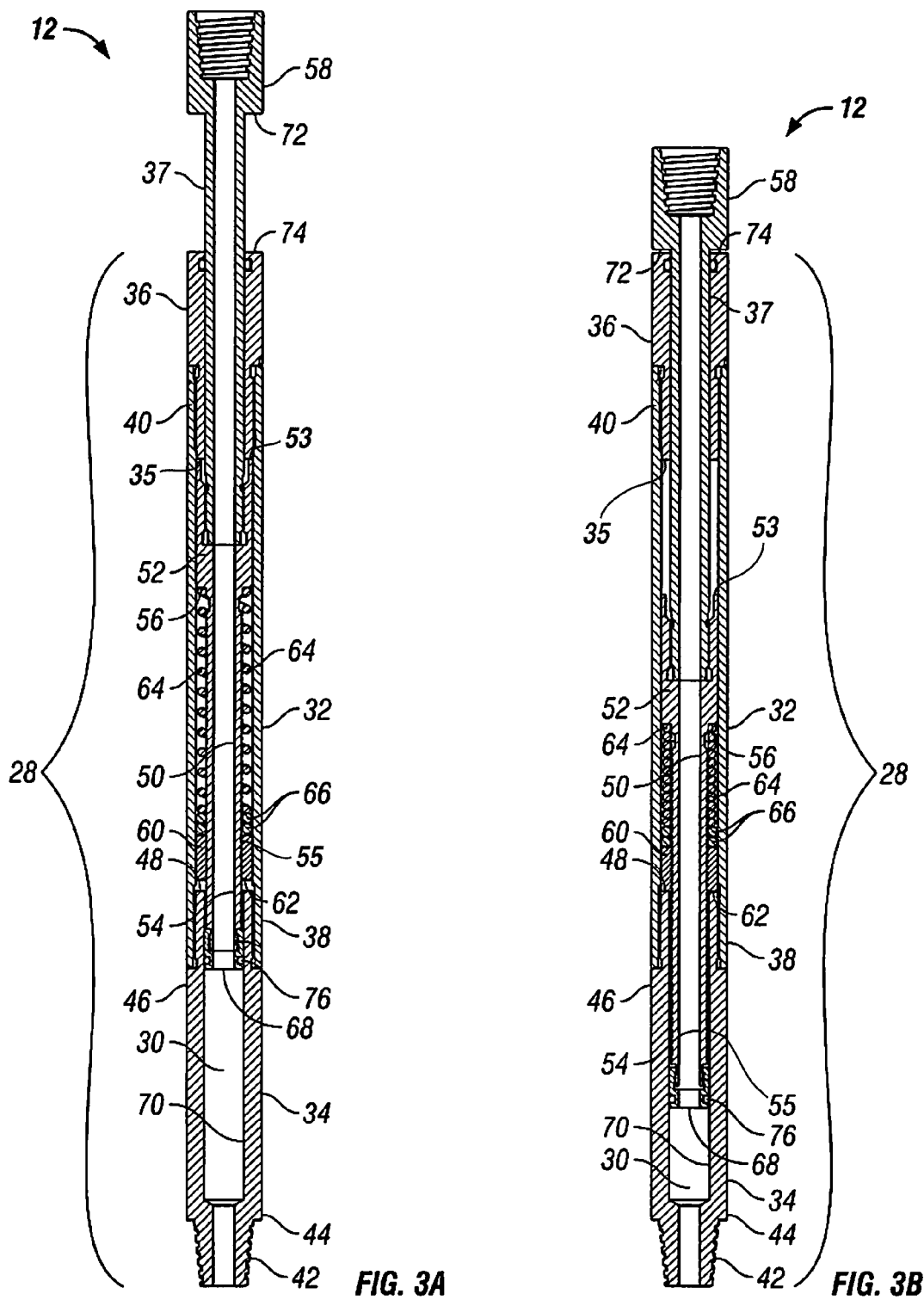
*FIG. 3A*  *FIG. 3B*

ROTATION TOOL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to down-hole tools and particularly to a mechanical rotation tool for use down-hole.

2. Description of the Related Art

In many drilling operations it is necessary to provide rotation to a tool or assembly down-hole. In many applications, such as a coil tubing string, the rotation must be induced by a method other than rotating the tubing extending intermediate the surface and the down-hole location.

Inducing rotation in tools is beneficial in a number of oil field operations, such as coil tubing fishing operations, alignment of tools or tubing, impact hammer applications, removal of pipeline blockages, and pipe line cleaning operations. Currently practiced rotation tools include hydraulic or electrical motors, and further include mechanical rotation-inducing tools.

U.S. Pat. Nos. 5,224,547 and 5,310,001, issued to Burns Sr., et al. and incorporated herein by reference, disclose a retrieving tool for down-hole packers utilizing non-rotational work strings and a rotating lower segment. The apparatus disclosed by Burns utilizes mating mandrels including J-slots to facilitate rotation of the lower segment. The J-slot design translates relative axial motion of the power mandrel and inner mandrel into relative rotational motion. The tools disclosed by Burns provide limited tool revolution per axial stroke of the power mandrel. Consequently, the power mandrel must complete a number of axial strokes, or cycles, to produce a single 360-degree revolution of the inner mandrel. In addition, the Burns reference does not provide for the use of a hydraulic disconnect below the apparatus.

U.S. Pat. No. 5,584,342, issued to the Applicant herein and incorporated herein by reference, discloses a subterranean rotation tool and method for translating axial motion into rotational motion at a remote location. A barrel slidably and rotatably maintains a sleeve within its axial bore. A threaded rotation member interacts with cooperative threading in the sleeve bore. Detents on the outer surface of the sleeve selectively interact with a clutch plate that extends partially through a receiving slot and into the barrel bore. The rotation member rotates in response to downward relative motion of the barrel but does not rotate in response to upward relative motion of the barrel.

U.S. Pat. No. 5,918,690, issued to Hailey, teaches a rotation actuator comprising an upper wash pipe having a helical groove mandrel in operative association with a ball clutch assembly that is secured to the upper wash pipe.

BRIEF SUMMARY OF THE INVENTION

The rotation tool of the present invention comprises a gear shaft attachable to a tube string, the gear shaft surrounded by a housing having a longitudinal bore therein, the housing rotationally and linearly moveable in relation to the gear shaft. The gear shaft has an external helical thread formed on at least a portion of its surface. A tubular gear disposed within the housing has an internal, helical thread engaging the gear shaft thread and further has a toothed face gear on its lower end for selective engagement with a corresponding face gear connected to the housing. The face gear teeth are constructed to engage on downward stroke of the gear shaft and disengage on upward stroke. A compression spring is disposed in the housing bore for biasing the tube gear structure toward the housing face gear.

Accordingly, it is an object of the present invention to provide a mechanical rotation tool that efficiently converts linear to rotational movement. Other objects of the invention are apparent from the following description, the claims set forth below, and the accompanying drawings.

BRIEF DESCRIPTION OF THE DRAWINGS

For a more complete understanding of the present invention and the advantages thereof, reference is now made to the following Detailed Description of an Example Embodiment of the Invention, taken in conjunction with the accompanying drawings, in which:

FIG. 3A is a longitudinal cross-sectional view of the rotation tool of FIG. 2A with the gear shaft and mandrel in their upper position.

FIG. 3B is a longitudinal cross-sectional view of the rotation tool of FIG. 3A with the gear shaft and mandrel in their lower position.

DESCRIPTION OF AN EXAMPLE EMBODIMENT OF THE INVENTION

Figure 1:
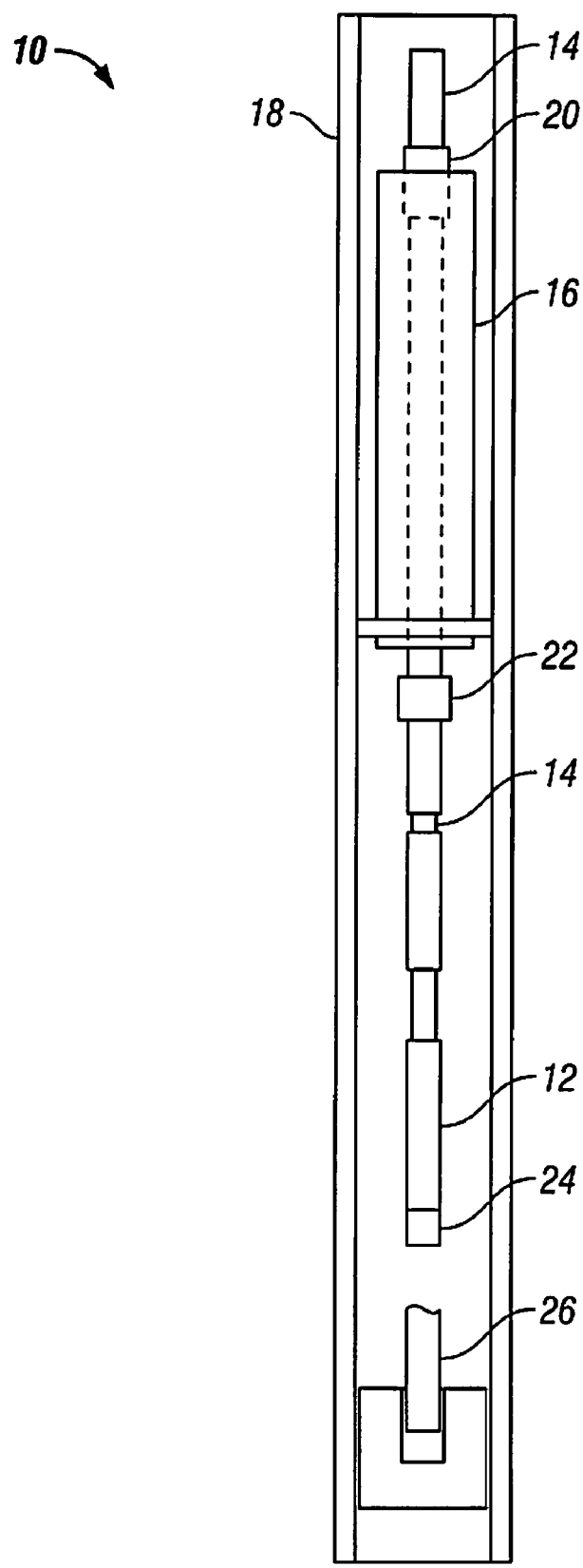
FIG. 1 depicts a tool string with the rotation tool of the present invention.

The invention and its advantages are best understood by referring to the drawings, like numerals being used for like and corresponding parts of the various drawings.

In FIG. 1 there is shown a schematic drawing of a fishing tool string, generally designated 10, utilizing the rotation tool 12 of the present invention. At the upper end of fishing tool string 10, coiled tubing string 14 passes through well casing 18 having a casing liner 16. Coiled tubing string 14 is made up of sections of coiled tubing 14 joined by coil connector 20. Hydraulic disconnect 22 permits transmission of a hydraulic disconnect actuating ball (not shown) through coiled tubing string 14. Hydraulic disconnect 22 includes a sealed environment that permits transmission of a pressurized fluid therethrough, if desired. Rotation tool 12 provides rotational movement to overshot 24 for connecting it to a broken tool string or "fish" 26.

Figure 2A:
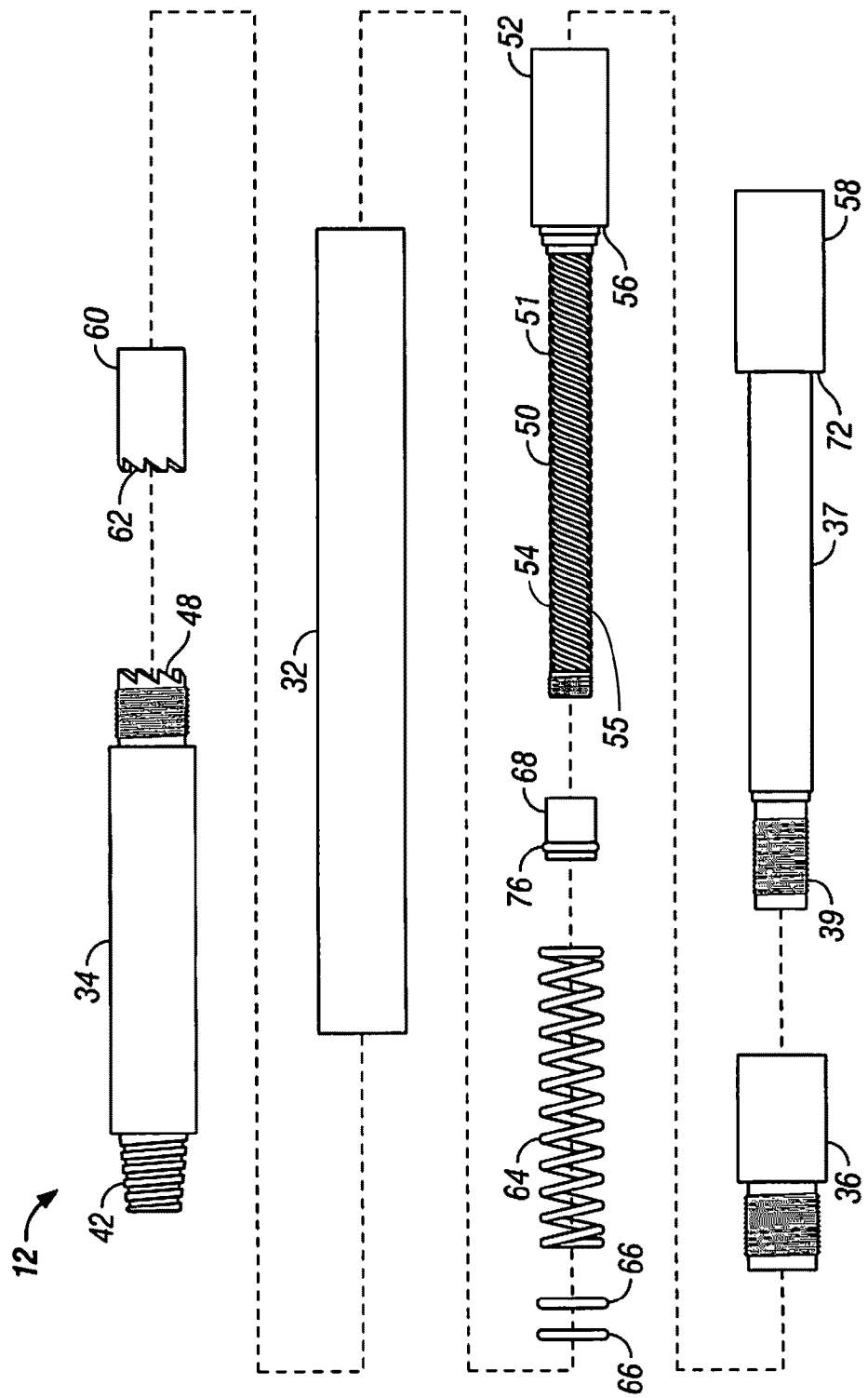
FIG. 2A is an exploded view of the rotation tool of the invention.

FIG. 2A is an exploded view of the rotation tool, generally designated 12, according to an example embodiment of the invention. In FIG. 3A there is shown a longitudinal cross-sectional view of rotation tool 12.

Rotation tool 12 includes housing 28 having a longitudinal bore 30 therethrough. Housing 28 includes barrel 32, bottom subassembly 34, and upper subassembly 36.

Rotation tool 12 also includes mandrel 37. By way of convention, throughout this description, "upper" shall refer to the end proximate mandrel 37. Accordingly, "upward" shall mean toward the upper end, or toward the mandrel 37. Likewise, "lower" shall refer to the end proximate bottom subassembly 34. "Downward" means toward the lower end, or toward bottom subassembly 34.

Bottom subassembly 34 is generally tubular in shape and is threadedly connected to the lower end 38 of barrel 32. Upper subassembly 36 is threadedly connected to the upper end 40 of barrel 32. Threaded connector 42 on the lower end 44 of bottom subassembly 34 permits the attachment of a tool, such as overshot 24 illustrated in FIG. 1, to rotation tool 12. The upper end 46 of bottom subassembly 34 includes an annular gear face 48.

Housing 28 is slidably moveable in relation to gear shaft 50 between a lower position illustrated in FIG. 3A, and an upper position illustrated in FIG. 3B.

Figure 2B:
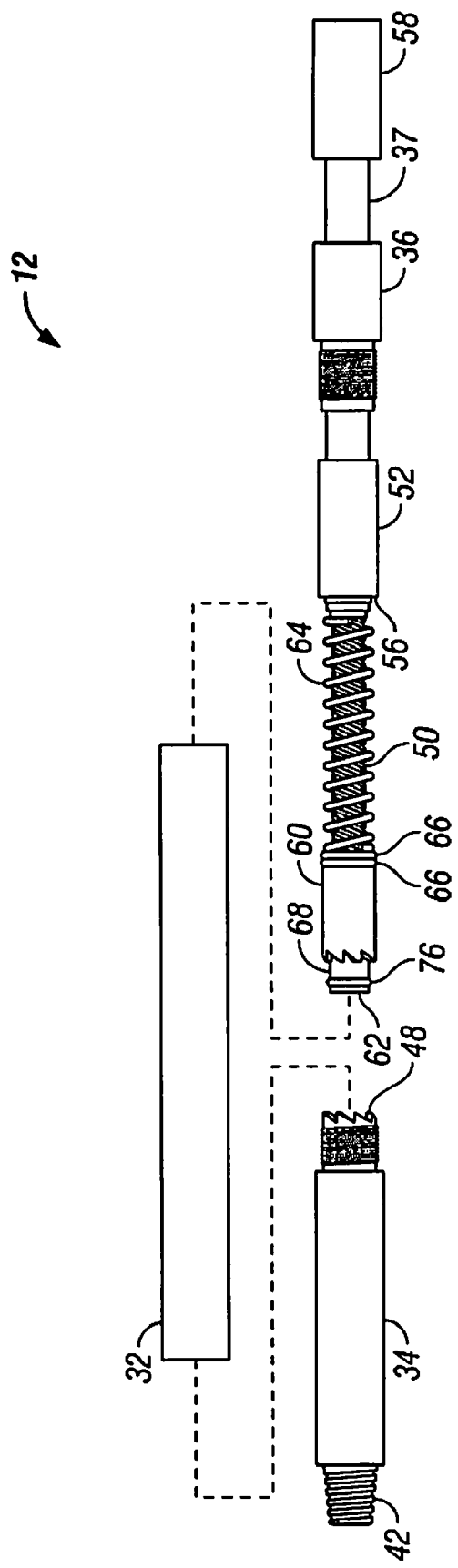
FIG. 2B is a partially disassembled view of the rotation tool of the present invention.

Gear shaft 50 has a larger diameter head 52 terminating at its upper end, and a smaller diameter portion 54 terminating at its lower end. The larger diameter head 52 of gear shaft 50 includes an annular shoulder 56. A helical thread 51 is formed on the exterior surface of the smaller diameter portion 54 of gear shaft 50, as seen in FIGS. 2A-2B. In an exemplary embodiment of the present invention the helical thread 51 is a 4-lead thread.

Mandrel 37 is generally cylindrically shaped with a hollow interior. Mandrel 37 is threadedly attachable at threaded end 39 to the upper end of gear shaft 50. In operation, mandrel 37 is driven by an external linear motion source, such as coiled tubing 14 illustrated in FIG. 1, and correspondingly drives gear shaft 50. Threaded connector 58 on the upper end of mandrel 37 permits the attachment to tubing 14 and thus attaches rotation tool 12 to tubing 14.

Piston 68 is threadedly attached to the lower end of gear shaft 50. As depicted in FIGS. 3A and 3B, piston 68 slidingly engages wall 70 of housing bore 30. O-ring 76 on the circumference of piston 68 provides a seal between gear shaft 50 and housing bore wall 70.

Figure 2C:
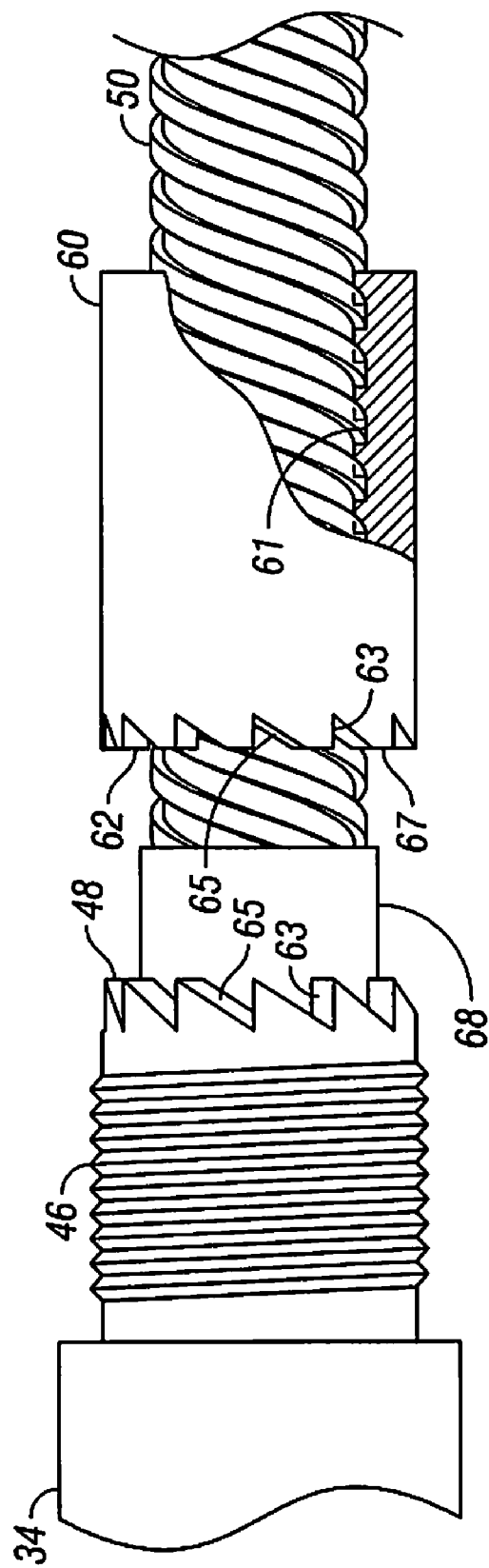
FIG. 2C is a view of the tube gear and face gear of the present invention.

A hollow cylindrical tube gear 60 is disposed within barrel 32 of housing 28. Referring to FIG. 2C, tube gear 60 has internal helical thread 61 engaging thread 51 of gear shaft 50. Helical threads 61 and 51 cooperatively require that tube gear 60 rotate on gear shaft 50 when gear shaft 50 is moved linearly in relation to tube gear 60.

The lower end of tube gear 60 has an annular, toothed face 62. A corresponding annular, toothed face 48 is provided on bottom subassembly 34. Toothed face 62 of tube gear 60 engages bottom subassembly 34 gear face 48 when gear shaft 50 is moving downward from its upper to its lower position in housing bore 30. Toothed face 62 of tube gear 60 disengages at least partially from bottom subassembly 34 gear face 48 when gear shaft 50 is moving from its lower position to its upper position in housing bore 30.

As best seen in FIG. 2C, the mating teeth on tube gear face 62 of tube gear 60 and housing gear face 48 of bottom subassembly 34 each have an engaging surface 63 and a beveled slip surface 65 such that the engaging surfaces 63 cause each of the face 62 and face 48 to rotate simultaneously in a one direction (the "engaging direction"). The engaging surfaces 63 are substantially parallel to the axis of the gear shaft 50, and correspondingly, the axis of the housing 28. When one of tube gear face 62 and housing face 48 is rotated opposite the engaging direction, beveled slip surfaces 65 allow face 62 and face 48 to rotate relative to each other. As shown, beveled surfaces 65 are constructed at an acute angle in relation to engaging surfaces 63. In addition, the teeth of toothed face 62 include a flat surface 67 substantially normal to engaging surfaces 63, essentially to allow smoother rotation when face 62 and face 48 are rotated opposite the engaging direction. It will be noted that an equivalent flat surface (not shown) to flat surface 67 could also be provided on face 48. For simplicity, interacting face 62 and face 48 are sometimes referred to herein as face gear 49.

Helical compression spring 64 is supported by gear shaft 50 between cylindrical gear 60 and shoulder 56 on gear shaft 50. Spring 64 biases the toothed face 62 of gear 60 into engagement with the bottom sub gear face 48 when the gear shaft 50 is set in its upper position. Such bias is useful on the upward movement of gear shaft 50 in relation to housing 28 to prevent downward travel of gear shaft 50 in relation to the housing 28 prior to engagement of face 62 and face 48.

Two rings 66 are supported by gear shaft 50 between gear 60 and spring 64. Rings 66 function as spacers and prevent direct frictional contact between spring 64 and gear 60.

In an exemplary embodiment of the invention, tube gear 60 is of brass, and the other components are made of steel.

FIG. 2A is an assembly view of the rotation tool 12. In FIG. 2A, upper subassembly 36 is installed on mandrel 37, and mandrel 37 is connected to gear shaft 50. Tube gear 60 is threaded onto the helical thread 51 of gear shaft 50 and piston 68 is installed on the lower end of gear shaft 50. Compression spring 64 and rings 66 are installed over gear shaft 50 between gear 60 and shoulder 56 on gear shaft 50. At this point, the only assembly remaining is the installation of barrel 32 to upper subassembly 36 and to bottom subassembly 34.

FIG. 2C depicts a detail view of the connection of gear shaft 50 and tube gear 60 to bottom subassembly 34. In FIG. 2C, gear shaft 50 is withdrawn from bottom subassembly 34 so that piston 68 is partially visible. In use, helical threaded section 55 of gear shaft 50 extends into bore 30 of bottom subassembly 34 as depicted in FIG. 3B.

Operation

FIGS. 3A and 3B illustrate the operation of rotation tool 12. In FIG. 3A, gear shaft 50 and mandrel 37 are in an upper position relative to the components of housing 28. In FIG. 3B, gear shaft 50 and mandrel 37 are in a lower position relative to housing 28.

The operation of rotation tool 12 is described herein as it might be used in a coil tubing fishing operation. The overshot 24 or spear is first attached to connector 42 on bottom subassembly 34 of the rotation tool 12. Rotation tool 12 is then lowered down through the well casing by coiled tubing string 14 until the tool is brought into contact with the tool to be worked upon by the overshot 24.

With rotation tool 12 in its vertical, operating position, tube gear 60 is biased toward the lower end of gear shaft 50 into contact with the upper end 46 of bottom subassembly 34, by its own weight and concurrently by the force of spring 64 acting on its upper end. Mandrel 37 and connected gear shaft 50 are propelled axially downward by the downward movement of coiled tubing string 14. The downward axial movement of gear shaft 50 causes vertically constrained gear 60 to rotate helically upon gear shaft 50. The rotation of gear 60 in turn rotates bottom subassembly 34 through their mating gear faces 62 and 48, respectively.

The rotation of bottom subassembly 34 rotates the entire barrel 32 and the overshot 24 attached to the lower end 44 of bottom subassembly 34. Rotation of these members continues with further downward movement of mandrel 37 until shoulder 72 on mandrel 37 abuts the upper end 74 of upper subassembly 36, thereby preventing further downward movement of gear shaft 50 and mandrel 37 in relation to housing 28.

Mandrel 37 and attached gear shaft 50 may then be pulled axially upward by the upward movement of coiled tubing string 14. The upward movement of gear shaft 50 causes tube gear 60 to rotate in opposite direction as from its rotation in the downward stroke. Such rotation is at least partially induced by spring 64 biasing the tube gear 64 toward the lower end of gear shaft 50. But for spring 64, tube gear 64 would be able to move upward with gear shaft 50 or rotate at its location proximate bottom subassembly 34 depending on weight of tube gear 64 and friction between tube gear 64 and barrel 32.

Upward movement of gear shaft 60 does not result in rotational movement of housing 28 as the beveled teeth of face gear 49 allow gear face 62 to rotate relative to gear face 48. Accordingly, face gear 49, comprising gear face 62 and gear face 48 comprises a releasably-engageable, one-direction face gear.

Further rotation of housing 28 and attached overshot 24 is accomplished by a subsequent downward stroke of mandrel 37 by downward movement of coiled tubing string 14, repeating the process described above.

Accordingly, rotation tool 12 provides rotation of housing 28 and its bottom subassembly 34 in response to downward axial motion of mandrel 37. Upon upward axial motion of mandrel 37 housing 28 is free to slide linearly in relation to gear shaft 50.

In this way, downward travel of mandrel 37 causes housing 28, bottom subassembly 34 and consequently overshot 24 or other attached tool to rotate. Upon upward stroke of mandrel 37, mandrel 37 and gear shaft 50 move upward in relation to housing 28. Mandrel 37 may then travel downward again, causing further rotation of the housing and attached tool.

Referring to FIG. 3A, upward movement of gear shaft 50 in relation to housing 28 is limited by abutment of lower end 35 of upper subassembly 36 with upper end 53 of gear shaft head 52. Referring to FIG. 3B, downward movement of gear shaft 50 in relation to housing 28 is limited by abutment of shoulder 72 on mandrel 37 with upper end 74 of upper subassembly 36

In the exemplary embodiment of rotation tool 12 having a 4-lead thread, rotation tool 12 produces a 360 degree rotation of housing 28 for each inch of downward movement of mandrel 37.

Depending on the orientation of the thread on gear shaft 50 and gear 60, rotation tool 12 can produce either clockwise or counterclockwise rotation of an attached tool, as might be needed in any particular application.

In an alternative embodiment of the invention, spring 64 is omitted. In such embodiment, tube gear 60 may be carried upward by gear shaft 50 on an up stroke depending on weight and friction forces. If tube gear 60 is carried upward, some turning efficiency may be lost prior to engagement of gear face 48 with gear face 62 in the downward stroke.

It will be seen from the foregoing description that the rotation tool 12 distributes rotational forces simultaneously over all of the mating teeth of gear face 62 and gear face 48 of bottom subassembly 34 and further provides concentric force distribution eliminating binding that can occur with eccentric loading.

The rotation tool of the present invention, and many of its intended advantages, will be understood from the foregoing description of an example embodiment, and it will be apparent that, although the invention and its advantages have been described in detail, various changes, substitutions, and alterations may be made in the manner, procedure, and details thereof without departing from the spirit and scope of the invention, as defined by the appended claims, or sacrificing any of its material advantages, the forms hereinbefore described being merely an exemplary embodiment thereof.

What is claimed is:

1. A rotation tool for use in a well borehole, comprising:
a housing;
said housing having a housing gear face;
a gear shaft;
said gear shaft having helical threading;
a tube gear;
said tube gear having helical threading engaging said gear shaft threading;
said tube gear having a tube gear face engaging said housing gear face;
said tube gear face and said housing gear face cooperatively comprising a face gear;
said tube gear operable to transmit linear movement of said gear shaft to rotational movement of said housing; and
said face gear operable to transmit rotation of said tube gear to rotation of said housing gear face in a first direction.

2. The rotation tool of claim 1 wherein:
said tube gear threading and said gear shaft threading oriented so that said tube gear revolves around said gear shaft upon linear movement of said gear shaft in relation to said tube gear.

3. The rotation tool of claim 2, wherein:
said tube gear is tubular in shape;
said tube gear threading comprising internal helical threading; and
said tube gear having a lower end;
said tube gear face at said tube gear lower end.

4. The rotation tool of claim 1 wherein:
rotation of said tube gear opposite said first direction does not rotate said housing face gear.

5. The rotation tool of claim 1 wherein:
said housing having a longitudinal housing bore;
said gear shaft disposed within said housing bore;
said housing and said gear shaft rotatably moveable in relation to each other; and
said housing and said gear shaft slideably moveable in relation to each other.

6. The rotation tool of claim 5 wherein:
said housing having a cylindrical housing wall;
said tube gear positioned intermediate said housing wall and said gear shaft; and
said housing gear face positioned intermediate said housing wall and said gear shaft.

7. The rotation tool of claim 6 wherein:
said housing moveable in relation to said gear shaft between an upper position and a lower position;
said housing moveable downward in relation to said gear shaft on a gear shaft upstroke; and
said housing moveable upward in relation to said gear shaft on a gear shaft downstroke.

8. The rotation tool of claim 7 wherein:
said face gear inducing rotation of said housing on a gear shaft downstroke; and
said tube gear face rotatable in relation to said housing gear face on a gear shaft upstroke.

9. The rotation tool of claim 8 wherein:
said gear shaft linearly moveable by an external movement source.

10. The rotation tool of claim 1 wherein:
said tube gear having a tube gear axis;
said tube gear face comprising a plurality of tube gear teeth;
each said tube gear teeth comprising an engaging tooth edge substantially parallel to said tube gear axis;

each said tube gear teeth further comprising a slip tooth edge inclined in relation to said tube gear axis;
said housing having a housing axis;
said housing gear face comprising a plurality of housing gear teeth;
each said housing gear teeth comprising an engaging tooth edge substantially parallel to said housing axis;
each said housing gear teeth further comprising a slip tooth edge inclined in relation to said housing axis;
whereby said tube gear engaging tooth edges engage said housing gear engaging tooth edges upon rotation of said tube gear in a first direction.

11. The rotation tool of claim 10 wherein:
said tube gear inclined tooth edges slideable in relation to said housing gear inclined tooth edges upon rotation of said tube gear in a second direction.

12. The rotation tool of claim 11, further comprising:
a spring provided intermediate said housing wall and said gear shaft; and
said spring biasing said tube gear toward said housing gear face.

13. The rotation tool of claim 11, further comprising:
a barrel having an upper end and a lower end;
a lower subassembly attached to a barrel lower end;
an upper subassembly attached to a barrel upper end;
said gear shaft having a gear shaft upper end;
a mandrel attached to said gear shaft upper end; and
said upper subassembly slideable on said mandrel.

14. The rotation tool of claim 11, further comprising:
at least one of said tube gear teeth or said housing gear teeth having flat faces substantially normal to said engaging tooth edges.

15. A rotation tool, comprising:
a housing having a longitudinal bore therein and a housing gear face within the bore;
a gear shaft slidably moveable in relation to the housing between an upper position and a lower position;
the gear shaft having an upper end and a lower end and helical threading formed on at least a portion of its surface;
a tube gear disposed within the housing intermediate the housing and the gear shaft;
said tube gear having helical threading engaging said gear shaft threading;
said tube gear having a toothed gear face; and
said tube gear face engaging said housing gear face.

16. The rotation tool of claim 15 wherein:
said tube gear face and said housing gear face cooperatively comprising a face gear;
said face gear operable to transmit rotation of said tube gear to rotation of said housing gear face in a first direction; and
rotation of said tube gear opposite said first direction does not rotate said housing face gear.

17. The rotation tool of claim 16 wherein:
said tube gear having a tube gear axis;
said tube gear face comprising a plurality of tube gear teeth;
each said tube gear teeth comprising an engaging tooth edge substantially parallel to said tube gear axis;
each said tube gear teeth further comprising a slip tooth edge inclined in relation to said tube gear axis;
said housing having a housing axis;
said housing gear face comprising a plurality of housing gear teeth;
each said housing gear teeth comprising an engaging tooth edge substantially parallel to said housing axis;
each said housing gear teeth further comprising a slip tooth edge inclined in relation to said housing axis;
whereby said tube gear engaging tooth edges engage said housing gear engaging tooth edges upon rotation of said tube gear in a first direction.

18. The rotation tool of claim 17 wherein:
said housing moveable in relation to said gear shaft between an upper position and a lower position;
said housing moveable downward in relation to said gear shaft on a gear shaft upstroke;
said housing moveable upward in relation to said gear shaft on a gear shaft downstroke;
said face gear inducing rotation of said housing on a gear shaft downstroke; and
said tube gear face rotatable in relation to said housing gear face on a gear shaft upstroke.

* * * * *